Sept. 28, 1965  R. W. LARSON  3,208,383
RAMJET VENT
Filed July 18, 1963  2 Sheets-Sheet 1

ROLAND W. LARSON
INVENTOR.

BY
Claude Funkhouser
ATTORNEY

Sept. 28, 1965 R. W. LARSON 3,208,383
RAMJET VENT
Filed July 18, 1963 2 Sheets-Sheet 2

ROLAND W. LARSON
INVENTOR.

BY
Claude Funkhouser
ATTORNEY

United States Patent Office 3,208,383
Patented Sept. 28, 1965

3,208,383
RAMJET VENT
Roland W. Larson, Silver Spring, Md., assignor to the United States of America as represented by the Secretary of the Navy
Filed July 18, 1963, Ser. No. 296,144
6 Claims. (Cl. 102—49)

This invention relates generally to supersonic, ramjet propelled aerial missiles, and more particularly to a cowl venting apparatus for such missiles whereby the ramjet engine's efficiency at low Mach numbers and its stability at high angles of attack to the airstream are increased, and whereby greater aerodynamic control is provided over the missile in the period during which it is attached to a booster.

Ramjet engines, whether designed for subsonic or supersonic operation, consist basically of a cylindrical tube, or duct, open at both ends and having a fuel injection system therein. The forward portion of the duct is a diffuser, wherein the velocity of incoming air is decreased concurrently with an increase in pressure. Behind the diffuser section is a combustion chamber, wherein fuel is combined with air flowing through the engine, the mixture burning to produce expanding hot gases which are then exhausted through an exit nozzle at the aft end of the duct.

The diffuser section of a supersonic ramjet engine designed for operation at high Mach numbers differs in construction from the diffuser section of an engine designed for transonic and subsonic operation, the latter diffuser normally consisting of no more than a simple divergent nozzle at the forward end of the engine's cylindrical duct. In a high Mach number supersonic ramjet engine this type of open diffuser is highly inefficient, due to the oblique nature of the shock waves surrounding the forward end of the engine and the high velocity of the entering air. When a simple open duct diffuser is utilized in the presence of oblique shock waves, a substantial amount of air flow is diverted around the inlet by said shock waves, thus limiting the amount flowing into the engine. Further, the air that does enter the duct is normally traveling at a velocity considerably in excess of sonic velocity. In such a supersonic flow it is very difficult to obtain good fuel burning.

To overcome the oblique shock wave problem in high Mach number ramjets an innerbody is mounted concentrically within the forward end of the engine duct, the tip of the innerbody being pointed and projecting forwardly of the duct structure, or cowl, surrounding said innerbody. The tip of the innerbody fuctions to decrease the obliquity of the shock waves and to slow the air to nearly sonic velocity, thus allowing a substantial volume of air to enter the annular diffuser area between the innerbody and its surrounding cowl. Air traveling through the oblique shock wave is slowed, and its pressure is increased. The air, which normally is still flowing at supersonic velocity, then enters the annular diffuser wherein it is slowed until it reaches the speed of sound and a normal shock wave is established between the cowl and the innerbody. Thus, air flowing into the combustor is at a high pressure and is moving at a subsonic velocity.

While the innerbody-type diffusers are reasonably efficient at high Mach numbers, the volume of air entering the annular diffuser at Mach numbers near the speed of sound is less than is desirable, due primarily to high pressures within the diffuser; hence, the amount of thrust produced at their lower velocities is often less than the minimum desired value. The present invention contemplates placing controllable vents in the cowl of the ramjet, whereby when desired a portion of the air flowing through the annular diffuser may be passed directly to atmosphere. This arrangement relieves the pressures at the rear of the diffuser section and thereby facilitates the flow of air into the combustor section of the ramjet.

Another serious problem with innerbody-type diffusers is that because of the annular configuration of their flow chambers they are highly sensitive to changes in angle of attack. The angle of attack for a ramjet is defined as the angle between the longitudinal axis of the engine and the free stream direction of air flow. As this angle increases from zero to, say, 10 degrees, air enters the annular diffuser duct primarily on but one side. The cowl vents of the present invention relieve this situation.

In the instant invention the controllable cowl vents are positioned in circumferentially spaced relationship about the diameter of the diffuser. When the angle of attack becomes great enough to limit air flow on one side of the annular duct, the vents on that side are opened, thus relieving the internal pressures. This permits an increased flow of air, and the adverse effects normally associated with angle of attack are thereby mitigated.

Ramjet engines, because they must be moving at nearly their design velocities before they can operate, are incapable of generating static thrust. Hence, a ramjet propelled missile must be accelerated to nearly design speed before the ramjet engine will begin to function with net positive thrust. To provide this initial acceleration one or more rocket booster vehicles are normally employed, the boosters being jettisoned after a velocity is attained at which ramjet operation can commence.

The combined missile and booster rocket often present a serious aerodynamic control problem, especially during the early stages of flight. The cowl vents of the invention make possible easier control of the combined vehicles' attitude.

As soon as the ramjet missile is accelerated air begins to flow into the diffuser, vents to atmosphere normally being provided adjacent the junction of the missile and its booster to facilitate this flow. Thus, if a cowl vent is opened air will exhaust therethrough from within the ramjet, thus creating a moment of force about the weapon's center of gravity. By selectively opening the circumferentially spaced cowl vents it is thus possible to exercise a degree of control over yaw and pitch of the combined missile and booster structure.

It is an object of this invention to provide a controllable cowl vent arrangement for ramjet propelled missiles, said arrangement being so constructed as to permit selective relief of pressure within the engine to thereby compensate for changes in velocity and angle of attack of the missile.

Another object of the invention is to provide a ramjet missile cowl vent arrangement so constructed as to facilitate aerodynamic control over the missile during the initial period of its flight.

A further object of the invention is to provide a cowl vent arrangement so constructed that the vent opening may be easily positioned at any desired opening between zero and maximum.

Other objects and many of the attendant advantages of this invention will be readily appreciated as the same becomes better understood by reference to the following detailed description when considered in connection with the accompanying drawings, wherein.

The present invention relates to ramjet missiles of the type consisting of a cylindrical airframe having a central duct, or passageway, extending therethrough, and having a plurality of aerodynamic surfaces thereon. The duct has an innerbody secured concentrically within its forward end and projecting forwardly therefrom, the inner body together with the surrounding cowl portion of the airframe comprising a supersonic diffuser. The portion of the duct behind the innerbody contains apparatus for injecting fuel and for stabilizing the burning of the resultant fuel-air mixture occurring when air flows through the engine. The duct terminates in an exit nozzle.

According to the invention, the airframe cowl portion surrounding the aft end of the innerbody is fitted with a plurality of circumferentially spaced, controllable opening vents. Each vent comprises an open frame having one or more movable vanes mounted therein, a suitable hydraulic or electric servo actuator for moving the vanes, and a mechanical bell crank linkage for connecting the vanes to the actuator. By selective opening and closing of the circumferentially spaced vents it is possible to achieve improved aerodynamic control over the missile, as well as increased efficiency and stability of the ramjet engine propelling said missile.

Figure 1:
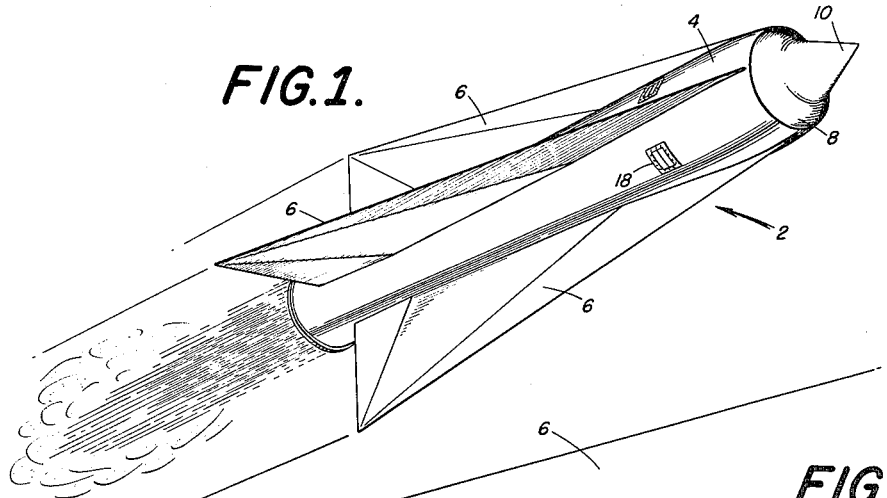
FIG. 1 is a perspective, showing in flight a ramjet missile employing the instant invention.
Figure 2:
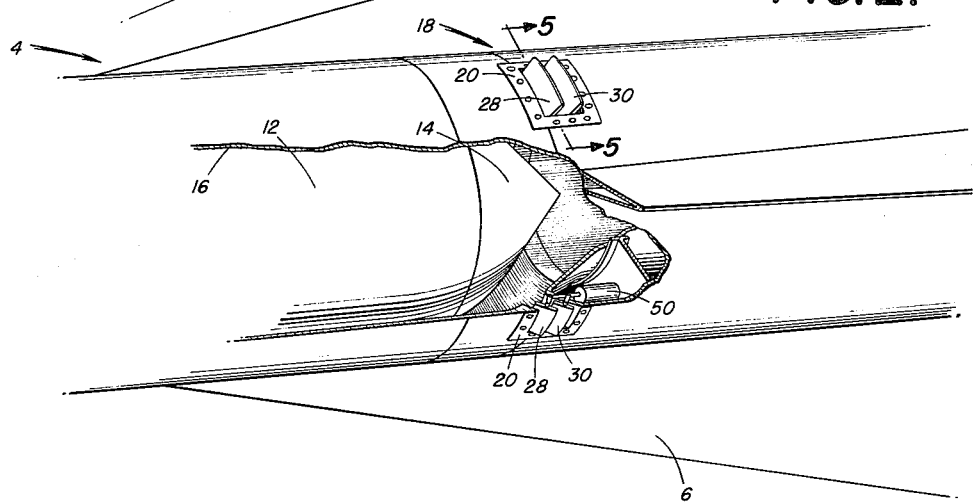
FIG. 2 is a perspective, partially broken away, showing the cowl venting arrangement of the invention.

Referring now to the drawings, a missile 2 is shown in FIGS. 1 and 2, and includes a cylindrical airframe 4 having a plurality of aerodynamic surfaces 6 attached thereto. The airframe 4 has a cylindrical duct extending therethrough, within which is mounted an innerbody 8.

The innerbody 8 has an isentropic, pointed nose portion 10, a cylindrical central portion 12, and a pointed aft end 14. The airframe 4 includes a cowl portion 16 which surrounds the innerbody 8 in spaced relationship, and which has attached thereto in circumferentially spaced array a plurality of vents 18.

Figure 5:
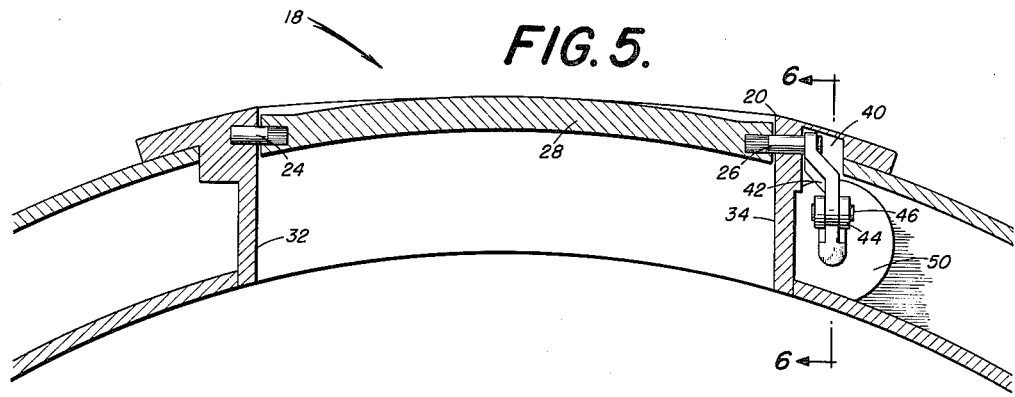
FIG. 5 is a section, taken generally at 5—5 in FIG. 2, showing in detail the construction of one of the cowl vents.
Figure 6:
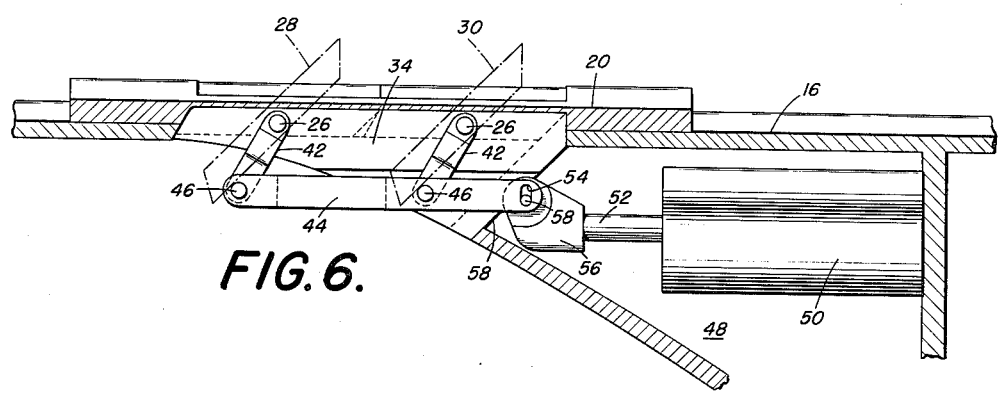
FIG. 6 is a detail section taken generally on line 6—6 in FIG. 5, and showing the mechanical linkage utilized for positioning the vanes.

The vents 18 are all identical, and each includes a generally rectangular frame 20 (FIGS. 2, 5 and 6), which is secured within a rectangular opening in the missile cowl 16 by a plurality of rivets or other suitable fasteners. The frame 20 extends through the rectangular opening, and has a flange at its upper end through which the rivets or other fasteners are passed for securing the frame in position.

The frame 20 has a rectangular opening therein within which are pivotally mounted, by shafts 24 and 26, a pair of identical vanes 28 and 30, the shafts 24 being journaled within bores in the side wall 32 of frame 20 and secured in the end portions of their respective vanes 28 and 30, and the shafts 26 being rigidly secured to their vanes and projecting through openings in the side wall 34 of said frame.

The frame 20 has a cutout portion 40 to accommodate the shafts 26 and has bell cranks 42, rigidly secured to their upper ends to said shafts. The corresponding lower end of the bell cranks 42 are received within cutouts in an arm 44, and are pivotally secured in position by pins 46. Thus, by moving arm 44 longitudinally the vanes 28 and 30 may be moved from the closed positions, shown in dotted lines in FIG. 6, to the open positions shown by broken lines in said figure.

A cavity 48 is provided under the cowl 16 for an actuator 50. The actuator, which may be either a hydraulic cylinder or an electro-servo device, has an actuator shaft 52 positioned for coupling to the arm 44. The end of the arm 44 is bifurcated, and has an elongated transverse opening 54 extending therethrough. The shaft 52 has a lug 56 thereon, which is received within the bifurcated end of the arm 44, where it is secured by a pin 58. The elongated opening 54 permits the arm 44 to shift vertically, as is required when the bell cranks 42 are actuated. A plate 58 is provided which substantially closes the cavity 48 to insure flow of air through the open vents.

The actuator 50 is remotely controlled, either from the ground or by a self-contained missile guidance system, to open and close the vanes 28 and 30 whenever desired and to whatever opening is necessary. Thus, the cowl vents 18 are controllable, and may utilized whenever the need therefor arises. Normally, four equally spaced vents are employed, although additional ones may be found desirable in some instances.

Figure 3:
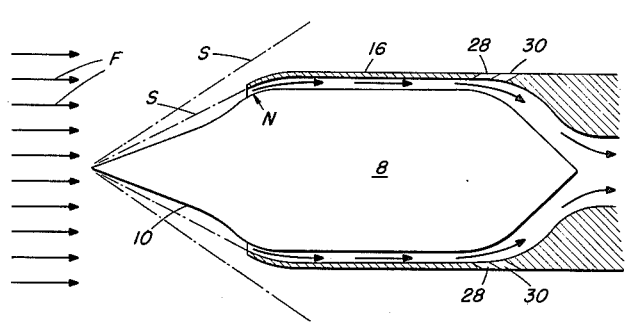
FIG. 3 is a schematic illustrating the manner in which an innerbody-type diffuser constructed according to the invention functions in a high supersonic airstream.

The manner in which the invention functions during operation of the ramjet engine will now be explained with reference to FIGS. 3 and 4, wherein the cowl 16, innerbody 8, and vanes 28 and 30 of the missile's diffuser section are illustrated in schematic form. Referring to FIG. 3, the missile is shown to be flying at zero angle of attack (parallel to the free stream airflow F) in a high supersonic airstream of, say, Mach 4. At this velocity a series of oblique shock waves S (only two of which are illustrated) are formed and are attached to the pointed tip of the spike portion 10 of the innerbody 8. The innermost of the shock waves S is attached to the forward rim of the cowl 16 when the missile is moving at design velocity, which results in what is commonly identified as shock-on-rim operation of the diffuser. Air (indicated by the arrows) flows successively through the oblique shock waves S, being slowed in velocity and undergoing an increase in pressure as it passes through each shock wave. After passing through the innermost shock wave, the air enters the annular diffuser defined between the innerbody 8 and the cowl 16, wherein it is slowed to sonic velocity and forms a normal shock wave at about point N. Thereafter, the air, which is now at a pressure several times that of the free stream air, flows around the innerbody 8 and back into the engine's combustion section. For so long as the ramjet missile is flying at zero angle of attack and at a constant velocity, the air flow through the engine is quite smooth and constant, resulting in smooth operation of the ramjet engine.

As the missile maneuvers during its flight, however, it assumes an attitude such that its longitudinal axis is at an angle to the free stream airflow. This condition is illustrated in FIG. 4, wherein the missile is shown to be at an angle of attack A to the free stream airflow F. When this condition occurs in a ramjet missile not equipped with the present invention the oblique shock waves assume a position relative to the diffuser such that shock-on-rim operation no longer is present, with the result that air is to an extent blocked from flowing into the lower portion of the annular diffuser opening. This position for the shock waves is indicated by broken lines at $S_1$ in FIG. 4.

Figure 4:
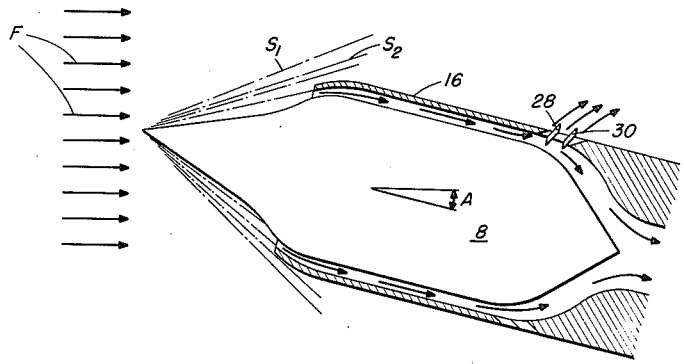
FIG. 4 is a schematic view similar to FIG. 3, but with the diffuser disposed at an angle to the free airstream.

When a missile employing the invention is flown at an angle of attack such as is shown by letter A in FIG. 4, the vanes of the vent on the leeward, or upper, side of the missile are opened, thus permitting air to flow to atmosphere from within the aft end of the diffuser. This airflow relieves the pressures in the diffuser adjacent the vent, and thus enables the volume of air entering the top portion of the diffuser to increase. The result of this increase is to shift the shock waves to a position similar to that shown at $S_2$, which results in increased smoothness of operation for the ramjet engine. It is thus readily seen that the various vents may be opened, singly or in combination to compensate for various angles of attack. The severity of the angle of attack determines the extent to which the vanes are to be moved, this position being computed by a suitable guidance system and the result supplied to the actuator which moves the vanes.

Another condition which results in a lower operating efficiency for the ramjet occurs when the supersonic missile is flown at near sonic velocity. This condition, which normally occurs only in the early, acceleration portion of the missile's flight, results in the shock waves S not being sufficiently oblique to furnish shock-on-rim operation. The obliqueness of the shock waves is proportional to velocity, and hence at sonic velocity a nearly normal shock wave ensues at the tip of spike 10. As is obvious, the amount of air that flows through such a shock wave and into the annular diffuser duct is quite limited. This condition can be alleviated to a great extent by opening all the vents 18 during lower velocity operation, to the end that pressures within the diffuser are substantially lowered. This lowering of diffuser pressure permits a greater volume of air to enter the annular duct, and hence results in an increased operational efficiency for the ramjet engine.

As has been hereinabove mentioned, ramjet missiles of the type to which this invention relates must be accelerated to a substantial velocity by one or more booster vehicles before the ramjet engine is capable of producing sufficient net thrust to propel the missile. These boosters, which usually are solid propellant rockets, are attached to the aft end of the ramjet vehicle, and are normally of a size greater than that of the ramjet missile. The combined missile-booster structure is difficult to control aerodynamically, and hence it is desirable to facilitate steering of the combined structure.

The ramjet missile is normally attached to the booster in such a manner that air is permitted to flow through the ramjet engine during the boost phase, suitable arrangements for venting the ramjet duct at its exit nozzle being provided. This flow of air during the boost phase serves the dual function of reducing missile drag and reducing the time between separation of the booster and the starting of the ramjet engine. Thus, there is available a volume of pressurized air within the ramjet engine duct during the boost phase. The cowl vents 18 of the subject invention make possible the utilization of the flow of pressurized air within the ramjet for aerodynamic control purposes during the period of the missile's flight when it is attached to its booster vehicle.

If one of the four vents 18 is opened during the boost phase a portion of the air flowing within the engine will be exhausted therethrough. The resultant jet of air, because of the location of the vents 18 a substantial distance from the center of gravity of the combined missile-booster structure, creates a moment force which tends to rotate said structure about said center of gravity. Thus, by selectively opening and closing one or more of the vents 18 it is possible to exercise a degree of yaw and pitch control over the missile-booster structure during the boost phase.

Obviously, many modifications and variations of the present invention are possible in the light of the above teachings. It is therefore to be understood that within the scope of the appended claims the invention may be practiced otherwise than as specifically described.

What is claimed is:

1. In an aerial missile having an elongated body,
  (A) a ramjet engine disposed within said body, said engine comprising a diffuser section having an isentropic, pointed nose portion, a cylindrical central portion, and a pointed aft end portion, a combustor section, and an exit nozzle,
  (B) a plurality of circumferentially spaced, selectively adjustable vent means positioned in said body adjacent said aft end portion of said diffuser section for regulating the air admitted to the diffuser section and for controlling the pitch and yaw of the missile, said vent means when in an open position communicating the aft portion of the interior of said diffuser with the atmosphere,
  (C) and actuating means positioned within said missile and connected with said vents for selectively opening and closing each of them.

2. The device as recited in claim 1, wherein each vent comprises at least one vane pivotally mounted about its center portion and adapted to partially interrupt the flow of air within said aft portion of said diffuser section and divert said air from said aft portion of said diffuser section to the atmosphere.

3. The device as recited in claim 1, wherein said actuating means comprises a selectively controllable hydraulic cylinder, and linkage means connecting said hydraulic cylinder with said vent means.

4. The device as recited in claim 2, wherein said actuating means comprises a selectively controllable hydraulic cylinder, and linkage means connecting said hydraulic cylinder with said pivotally mounted vane member.

5. The device as recited in claim 1, wherein each vent means comprises a first and second vane element pivotally mounted about their center portions transversely of the longitudinal axis of said missile, said actuating means includes a selectively controllable hydraulic cylinder adapted to adjust said vane elements to provide variable venting of said diffuser air, and linkage means connecting said hydraulic cylinder with said pivotally mounted vane member.

6. The device as recited in claim 1, wherein said vent means comprises a frame member mounted on the body of said missile, first and second vane elements pivotally mounted within said frame transversely of the longitudinal axis of said missile, an actuating mechanism including a selectively controllable hydraulic cylinder having an actuator shaft mounted within the body of said missile, and a linkage interconnecting said actuator shaft with said vane elements, said linkage including a first link element attached to said actuator shaft and auxiliary link elements connecting said first link element to said first and second vane elements.

References Cited by the Examiner

UNITED STATES PATENTS 2,966,028  12/60  Johnson et al. _____ 60—35.6
2,973,921  3/61   Price _____ 60—35.6
2,995,894  8/61   Baxter et al. _____ 102—50 X

FOREIGN PATENTS 614,548  12/48  Great Britain.

BENJAMIN A. BORCHELT, *Primary Examiner.*

SAMUEL FEINBERG, *Examiner.*